United States Patent
Le Huerou et al.

(10) Patent No.: US 11,412,026 B2
(45) Date of Patent: Aug. 9, 2022

(54) METHOD FOR COMMUNICATION AMONG A PLURALITY OF USERS PROVIDED WITH COMMUNICATION TERMINALS, VIA A VIRTUAL COMMUNICATION SPACE

(71) Applicant: Orange, Paris (FR)

(72) Inventors: Emmanuel Le Huerou, Saint Quay Perros (FR); Francois Toutain, Louannec (FR); Violaine Mercier, Pleumeur Bodou (FR)

(73) Assignee: ORANGE, Issy-les-Moulineaux (FR)

( * ) Notice: Subject to any disclaimer, the term of this patent is extended or adjusted under 35 U.S.C. 154(b) by 459 days.

(21) Appl. No.: 14/649,407

(22) PCT Filed: Dec. 3, 2013

(86) PCT No.: PCT/FR2013/052915
§ 371 (c)(1),
(2) Date: Jun. 3, 2015

(87) PCT Pub. No.: WO2014/087086
PCT Pub. Date: Jun. 12, 2014

(65) Prior Publication Data
US 2016/0014188 A1    Jan. 14, 2016

(30) Foreign Application Priority Data

Dec. 3, 2012    (FR) ...................... 1261555

(51) Int. Cl.
*H04L 67/02*    (2022.01)
*H04L 47/70*    (2022.01)
*H04L 65/60*    (2022.01)

(52) U.S. Cl.
CPC ............ *H04L 67/02* (2013.01); *H04L 47/828* (2013.01); *H04L 65/60* (2013.01)

(58) Field of Classification Search
CPC ....... H04L 67/02; H04L 47/828; H04L 65/60; H04L 51/10; H04L 51/18; G06F 17/30058
(Continued)

(56) References Cited

U.S. PATENT DOCUMENTS

| 6,075,571 | A  * | 6/2000 | Kuthyar  | H04N 7/15 |
| | | | | 348/14.07 |
| 6,175,872 | B1 * | 1/2001 | Neumann | G10H 1/0066 |
| | | | | 709/200 |

(Continued)

FOREIGN PATENT DOCUMENTS

CN    101227418 A    7/2008

OTHER PUBLICATIONS

English translation of the International Written Opinion dated Mar. 5, 2014 for corresponding International Application No. PCT/FR2013/052915, filed Dec. 3, 2013.
(Continued)

*Primary Examiner* — Madhu Woolcock
(74) *Attorney, Agent, or Firm* — David D. Brush; Westman, Champlin & Koehler, P.A.

(57) ABSTRACT

A method enables a plurality of users having communication terminals to communicate via a virtual communication space provided by a communication server on a communication network. The method includes configuring a server application so as to create a virtual communication space for a determined group of users. The virtual space provides a plurality of distinct communication modes referred to as "activities", each activity relating to at least one associated multimedia content, referred to as "activity content" that is shared by the users of the group. Each activity is performed by determined actions that can be triggered by any of the users of the group. The actions includes at least creating,
(Continued)

modifying, or deleting a given activity content. Action requests relating to an activity under consideration and coming from the terminals of the users of the group are processed in a sequential manner in the order of their arrival.

6 Claims, 2 Drawing Sheets

(58) Field of Classification Search
USPC .............................. 709/203, 204, 205, 227
See application file for complete search history.

(56) References Cited

U.S. PATENT DOCUMENTS

| | | | | |
|---|---|---|---|---|
| 6,507,865 | B1* | 1/2003 | Hanson | G06Q 10/10 |
| | | | | 705/36 R |
| 6,594,693 | B1* | 7/2003 | Borwankar | H04L 12/1827 |
| | | | | 709/203 |
| 6,614,451 | B1* | 9/2003 | Hudson | G06F 3/0489 |
| | | | | 715/753 |
| 7,010,571 | B1* | 3/2006 | Quatrano | H04L 29/06 |
| | | | | 709/203 |
| 7,383,308 | B1* | 6/2008 | Groves | G06Q 10/109 |
| | | | | 709/206 |
| 7,543,237 | B2* | 6/2009 | Kontny | G06Q 10/10 |
| | | | | 715/733 |
| 7,610,287 | B1* | 10/2009 | Dean | H04L 12/1818 |
| | | | | 707/999.009 |
| 8,112,490 | B2* | 2/2012 | Upton | H04L 12/1827 |
| | | | | 709/208 |
| 8,453,052 | B1* | 5/2013 | Newman | G06Q 10/101 |
| | | | | 715/255 |
| 8,751,247 | B1* | 6/2014 | O'Neil | G06Q 10/101 |
| | | | | 705/1.1 |
| 8,924,864 | B2* | 12/2014 | Mariotti | G06F 19/321 |
| | | | | 715/753 |
| 9,280,529 | B2* | 3/2016 | Lemonik | H04L 67/10 |
| 2003/0156591 | A1* | 8/2003 | Sorsa | H04L 67/14 |
| | | | | 370/401 |
| 2004/0221043 | A1* | 11/2004 | Su | H04L 12/18 |
| | | | | 709/227 |
| 2005/0135279 | A1* | 6/2005 | Zabawskyj | H04L 12/1822 |
| | | | | 370/260 |
| 2005/0151836 | A1* | 7/2005 | Ni | H04N 7/147 |
| | | | | 348/14.09 |
| 2006/0053194 | A1* | 3/2006 | Schneider | H04L 12/1827 |
| | | | | 709/204 |
| 2006/0053196 | A1* | 3/2006 | Spataro | H04L 65/403 |
| | | | | 709/205 |
| 2006/0087987 | A1* | 4/2006 | Witt | H03M 7/30 |
| | | | | 370/260 |
| 2007/0118525 | A1* | 5/2007 | Svendsen | H04L 67/1063 |
| | | | | 707/999.009 |
| 2007/0192275 | A1* | 8/2007 | Foygel | G06F 16/93 |
| 2007/0198534 | A1* | 8/2007 | Hon | G06F 17/30058 |
| 2007/0198647 | A1* | 8/2007 | Lingafelt | H04L 12/1822 |
| | | | | 709/207 |
| 2007/0239825 | A1* | 10/2007 | Walter | H04N 7/152 |
| | | | | 709/204 |
| 2007/0244906 | A1* | 10/2007 | Colton | G06F 40/166 |
| 2008/0013537 | A1* | 1/2008 | Dewey | H04L 63/083 |
| | | | | 370/390 |
| 2008/0069011 | A1* | 3/2008 | Sekaran | H04L 65/4038 |
| | | | | 370/260 |
| 2008/0239994 | A1* | 10/2008 | Xiong | H04M 3/567 |
| | | | | 370/260 |
| 2008/0307035 | A1* | 12/2008 | Burckart | G06F 17/30867 |
| | | | | 709/203 |
| 2009/0157608 | A1* | 6/2009 | Strathearn | G06F 16/40 |
| | | | | 707/999.102 |
| 2009/0279455 | A1 | 11/2009 | Wang et al. | |
| 2011/0004501 | A1 | 1/2011 | Pradhan et al. | |
| 2011/0119598 | A1* | 5/2011 | Traylor | G06Q 10/10 |
| | | | | 715/753 |
| 2011/0142221 | A1* | 6/2011 | Tofighbakhsh | H04M 3/44 |
| | | | | 379/202.01 |
| 2012/0054281 | A1 | 3/2012 | Westmoreland | |
| 2012/0130954 | A1* | 5/2012 | Hood | G06Q 10/10 |
| | | | | 707/640 |
| 2012/0284176 | A1* | 11/2012 | Svendsen | H04N 21/25435 |
| | | | | 715/753 |
| 2013/0132485 | A1* | 5/2013 | Thomas | H04L 65/403 |
| | | | | 709/205 |
| 2013/0167039 | A1* | 6/2013 | Howell | G06F 17/30867 |
| | | | | 715/748 |
| 2013/0262574 | A1* | 10/2013 | Cohen | H04L 51/18 |
| | | | | 709/204 |
| 2014/0033067 | A1* | 1/2014 | Pittenger | G06F 21/606 |
| | | | | 715/751 |
| 2014/0075518 | A1* | 3/2014 | D'Souza | H04L 9/14 |
| | | | | 726/4 |
| 2014/0108333 | A1* | 4/2014 | Jain | G06Q 50/01 |
| | | | | 707/609 |
| 2014/0214503 | A1* | 7/2014 | Chircorian | G06Q 10/10 |
| | | | | 705/14.4 |
| 2014/0337279 | A1* | 11/2014 | Mo | G06Q 10/101 |
| | | | | 707/608 |
| 2015/0026595 | A1* | 1/2015 | Lu | H04L 65/4015 |
| | | | | 715/753 |

OTHER PUBLICATIONS

International Search Report and Written Opinion dated Mar. 5, 2014 for corresponding International Application No. PCT/FR013/052915, filed Dec. 3, 2013.

English translation of the Chinese Office Action dated Aug. 11, 2017 for corresponding Chinese Application No. 201380071134.6.

\* cited by examiner

METHOD FOR COMMUNICATION AMONG A PLURALITY OF USERS PROVIDED WITH COMMUNICATION TERMINALS, VIA A VIRTUAL COMMUNICATION SPACE

CROSS-REFERENCE TO RELATED APPLICATIONS

This Application is a Section 371 National Stage Application of International Application No. PCT/FR2013/052915, filed Dec. 3, 2013, the content of which is incorporated herein by reference in its entirety, and published as WO 2014/087086 on Jun. 12, 2014, not in English.

FIELD OF THE DISCLOSURE

The invention relates in general manner to the field of telecommunications and more precisely it enables users having telecommunication terminals to communicate via a virtual multimedia communication space hosted by a server.

BACKGROUND OF THE DISCLOSURE

With the development over recent years of communication terminals such as smart phones, and of communications networks, in particular with the appearance of so-called social networks based on the Internet, the users of fixed or mobile terminals can make use of applications installed on their terminals and/or accessible over the Internet for the purpose of sharing activities such as sharing photos or videos, playing games, or exchanging messages. By way of example, mention may be made of the Facebook™ social network service that serves in particular to enable friends to share photos and/or videos, the WhatsApp™ mobile application incorporating an instant messaging system, and the Draw Something™ drawing game mobile application. Present techniques for sharing activities thus appear to be relatively specialized.

Applications for working in collaboration are also known, and, where appropriate, they provide a virtual work space, i.e. a site that centralizes all of the tools associated with undertaking a project or a particular task. By way of example, mention may be made of known applications such as WebEX™ (video conference, web conference) or Google Docs™ (web office suite). In general manner, applications of the above specified types enable users to perform synchronous or asynchronous exchanges that apply to multimedia documents stored in centralized manner in a server. The ability of a given user to create, modify, or read a document depends on managing access rights settings for that user.

In the field of interpersonal communication by exchanging messages or by voice communication, recent applications on smart phones give the user the option of saving local copies of text messages (short message service (SMS), multimedia message service (MMS)) and of voice messages as exchanged with contacts. Such local saving is specific to a particular user and is not shared with the contacts involved in the exchanges. Consequently, conventional communication techniques operate independently of one another and they do not ensure consistency between the communication data as saved in the terminals of users involved in the communications under consideration.

In the context of the above-described state of the prior art, it can be seen that communication applications and also applications for sharing activities between users are heterogeneous, and in particular that management of the confidentiality of the data that is shared or exchanged, i.e. management of the rights given to users for accessing the exchange data is heterogeneous, since it depends on the application under consideration. At present, there therefore does not exist any interpersonal communication technique that is capable of providing the users of terminals with a common communication space within which there prevails shared ownership of the means of communication and of the associated data, such as the shared multimedia contents and the data providing the history of interactions between users and with the contents, and without there being any need to set up specific rights management.

Consequently, there exists at present a need for techniques that make it possible to provide a digital space that is common to a set of users, this common space being structured for various activities of synchronous or asynchronous type, including conventional communication modes (exchanging messages, voice communications, video conferences, . . . ) and communication modes relating to shared multimedia contents, without requiring complex management of access rights.

SUMMARY

A particular aspect of the present invention relates to a communication method enabling a plurality of users having communication terminals to communicate via a virtual communication space provided by a communication server on a communication network. In accordance with the invention, such a method comprises the operations consisting in:

configuring a server application so as to create a virtual communication space for a determined group of users, said virtual space providing a plurality of distinct communication modes referred to as "activities", at least one activity relating to at least one associated multimedia content, referred to as "activity content" that is shared by the users of the group and that is performed by determined actions that can be triggered by any of the users of the group, said actions including at least actions of creating, modifying, or deleting a given activity content; and processing action requests relating to an activity under consideration, and coming from the terminals of the users of the group, said requests being processed in sequential manner in the order of their arrival.

By means of the communication method of the invention as defined above in general terms, a group of users can make use of a virtual communication space that is multimedia, i.e. that provides a variety of communication modes, such as telephone communication, videophone communication, and exchanging messages of the SMS or MMS type, email, or instant messaging (also known as "chat"); while also offering communication modes involving synchronous or asynchronous sharing of multimedia contents: photos, videos, drawings, etc. Furthermore, in the invention, all of the users of the group under consideration have the same rights to access and modify the shared contents, thereby simplifying settings for the server application, and providing the various users of the group with a kind of shared ownership of the virtual space and of the associated contents. Processing the action requests sent by the users of the server in the order of arrival of the requests serves to compensate for the absence of any management of access rights defined as a function of each user, and to establish a virtual communication space in which all of the members of the group have the same rights.

In a particular implementation of the invention, the operation of configuring the server in order to create the virtual space comprises the following steps, which are performed via an access web page of the server that is displayed in a terminal of a first user:

designating the users of the group of users of the virtual space, each user of the group being associated with a user identifier;

selecting activities shared by the group via the virtual space; and transmitting notifications to the designated users of the group inviting the users to connect to the virtual space.

Thus, in this implementation, the user who creates the virtual space (i.e. the first user) may for example select the users for the group of users from among contacts identified in the address book of the first user's terminal, thereby making it easier to create a community of users sharing a virtual communication space. The notifications inviting users to connect to the virtual space that has just been created by the first user enable the designated users of the group firstly to be informed that the virtual communication space has been created, and secondly, in an implementation, to become aware of the identification data (identifier and possibly associated password) that will give them access to the virtual space via the access page of the server.

In an implementation, each of the terminals of the users of the group is provided with a client application for access to the virtual space, the client application being suitable for triggering connection of the terminal to the server, the connection causing a copy replicating the multimedia contents associated with the activities provided by the virtual space to be downloaded into a cache memory of the terminal.

In other words, with the above characteristic of the invention, once the client application has been launched in the terminal of a user of the group of users, the application automatically triggers downloading of a current state of the virtual space and stores this state temporarily in a cache type memory of the terminal. This provision advantageously enables the user of the terminal in question firstly to use the graphics interface of the client application to view the state of utilization, by all of the users of the group, of the various communication modes made available by the virtual space, and secondly to take action on content as stored locally (e.g. a photo) for greater responsiveness, while also having the possibility of taking action on content when not connected to the server.

In an implementation of the invention, the client application of a user terminal connected to the server performs an initial operation of updating algorithms in the terminal for executing activities supplied by the virtual space hosted in the server.

A given activity provided by the communication space may be defined by a certain number of actions relating to a multimedia content, such as a video, and associated processing, with this being implemented by an execution algorithm of the activity under consideration (in the form of a software module). The above-mentioned initial operation of updating activity execution algorithms in the terminal enables the terminal to download algorithms that were not present initially in the version of the client application installed in the terminal, or to install new execution algorithms corresponding to new activities.

In another implementation of the communication method of the invention, when the processing in the server of an action request relating to an activity under consideration causes the action to be executed, the multimedia content(s) associated with the activity under consideration is/are updated in the copies replicating the multimedia contents of the virtual space as stored in the cache memories of each of the user terminals.

Thus, the users of the group sharing the communication space have available locally, i.e. in their respective terminals, an up-to-date version of the virtual space with the most recent modifications made to the virtual space. This up-to-date version consequently leads to updating of the graphics interface performed by the client application of the invention and executed in each of the terminals.

In a second aspect, the invention provides a communication server adapted to implement a communication method of the invention on a communication network enabling a plurality of users having communication terminals to communicate via a virtual communication space provided by said server. In accordance with the invention, such a server comprises:

means for creating a virtual communication space for a determined group of users, the virtual space providing a plurality of distinct communication modes referred to as "activities", at least one activity relating to at least one associated multimedia content, referred to as the "activity content" that is shared by the users of the group, the at least one activity being performed by determined actions that can be triggered by any of the users of the group, said actions including at least actions of creating, modifying, or deleting a given activity content; and means for processing action requests relating to an activity under consideration and coming from the terminals of the users of the group, said requests being processed in sequential manner in the order of their arrival.

Correspondingly, in a third aspect, the invention provides a communication terminal, comprising:

means for connection to a communication server on a communication network in order to create a virtual communication space for a determined group of users, the virtual space providing a plurality of distinct communication modes referred to as "activities", at least one activity relating to at least one associated multimedia content, referred to as the "activity content" that is shared by the users of the group, the at least one activity being performed by determined actions that can be triggered by any of the users of the group, said actions including at least actions of creating, modifying, or deleting a given activity content; and means for generating requests for actions relating to an activity under consideration and for sending them to the server, the action requests relating to an activity under consideration and coming from the terminals of the users of the group being processed in sequential manner in the order of their arrival in the server.

According to particular characteristics of the invention, such a communication terminal comprises:

means for acting after connection to the communication server to store a copy replicating the multimedia contents associated with the activities provided by the virtual space and for updating the copy replicating the multimedia contents; and means for storing algorithms for executing activities provided by the virtual space provided by the server, and for updating the algorithms.

In general manner, the above-described communication method of the invention is implemented by executing software applications installed and executed respectively in a communication server (server application) and in a communication terminal (client application) of the invention. These software applications implement one or more computer programs including instructions that, when executed by a processor of the server or of the terminal, as the case may be, serve to perform the steps of a communication method of the invention.

Consequently, in a third aspect, the present invention provides a computer program installed in a communication server of the invention or in a communication terminal of the invention, such a program including instructions that, when executed by a processor, cause a communication method of the invention to be performed.

Furthermore, the above-mentioned computer program may use any programming language, and may be in the form of source code, object code, or code intermediate between source code and object code, e.g. in a partially compiled form.

In practice, such a computer program is stored on a computer readable data medium, and consequently the present invention also provides a computer readable data medium having stored thereon instructions of a computer program of the invention. Such a data medium may be constituted by any entity or device capable of storing such a program. For example, the medium may comprise storage means, such as a read only memory (ROM), e.g. a compact disk (CD) ROM, or a microelectronic circuit ROM, or indeed removable storage means such as a universal serial bus (USB) key or magnetic recording means such as a hard disk. Furthermore, a program or software module of the invention may in particular be downloaded from an Internet type network.

The advantages provided by a communication server, a communication terminal, and a computer program as briefly summarized above are identical and contribute to those already mentioned for the communication method of the invention, so these advantages are not repeated at this point.

BRIEF DESCRIPTION OF THE DRAWINGS

Other characteristics and advantages of the present invention appear from the following detailed description, which refers to the accompanying drawings, in which.

DETAILED DESCRIPTION OF ILLUSTRATIVE EMBODIMENTS

Figure 1:
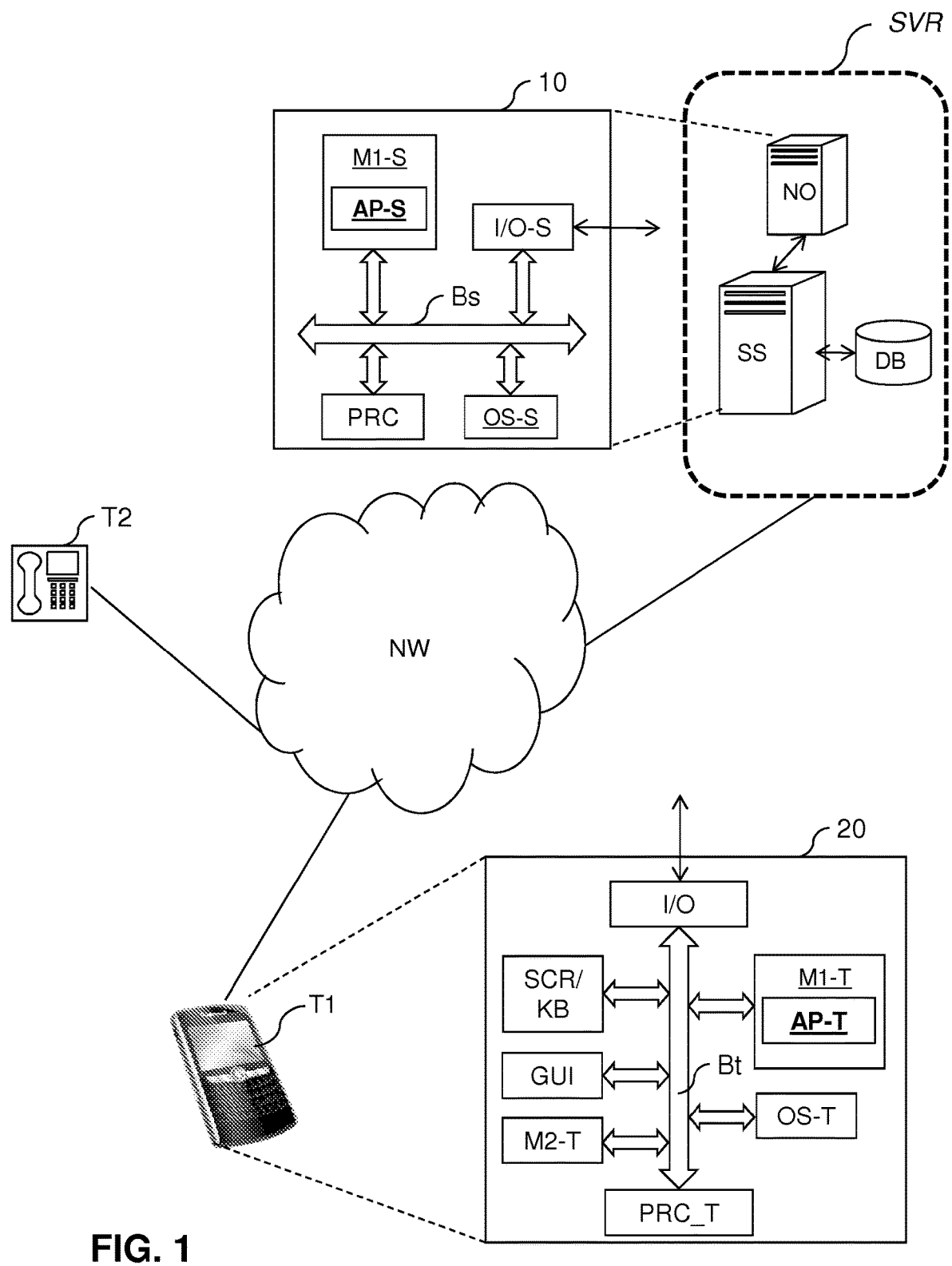
FIG. 1 shows an example of a telecommunication system in which the present invention is implemented, and in particular it shows the functional elements that are incorporated respectively in a communication terminal and in a communication server in accordance with the invention.

FIG. 1 shows an example of a telecommunications system in which the invention is implemented. In this example, only two user communication terminals T1 and T2 are shown, e.g. terminals of the smart phone type suitable for connecting to a so-called "$3^{rd}$ generation" mobile network, e.g. complying with the universal mobile telecommunications system (UMTS) standard, or a so-called "$4^{th}$ generation" mobile network, e.g. in compliance with the long term evolution (LTE) standard. The terminals T1 and T2 are also suitable for connecting to a communication network NW, which is constituted in this example by an Internet protocol (IP) network, such as the Internet.

The system also has a communication server SVR connected to the network NW and providing a service of hosting and managing virtual communication spaces in accordance with the invention. The server SVR comprises, in simplified manner: a database DB for storing the data relating to the virtual spaces created by groups of users; and a notification server entity NO for transmitting notifications to members of a group to notify them in particular about changes that have taken place in the communication space of the group in question. The server SVR includes a space server entity SS that serves to implement the communication modes (activities) defined for each communication space that has been created, in association with the database DB and with the notification server entity NO.

Figure 2:
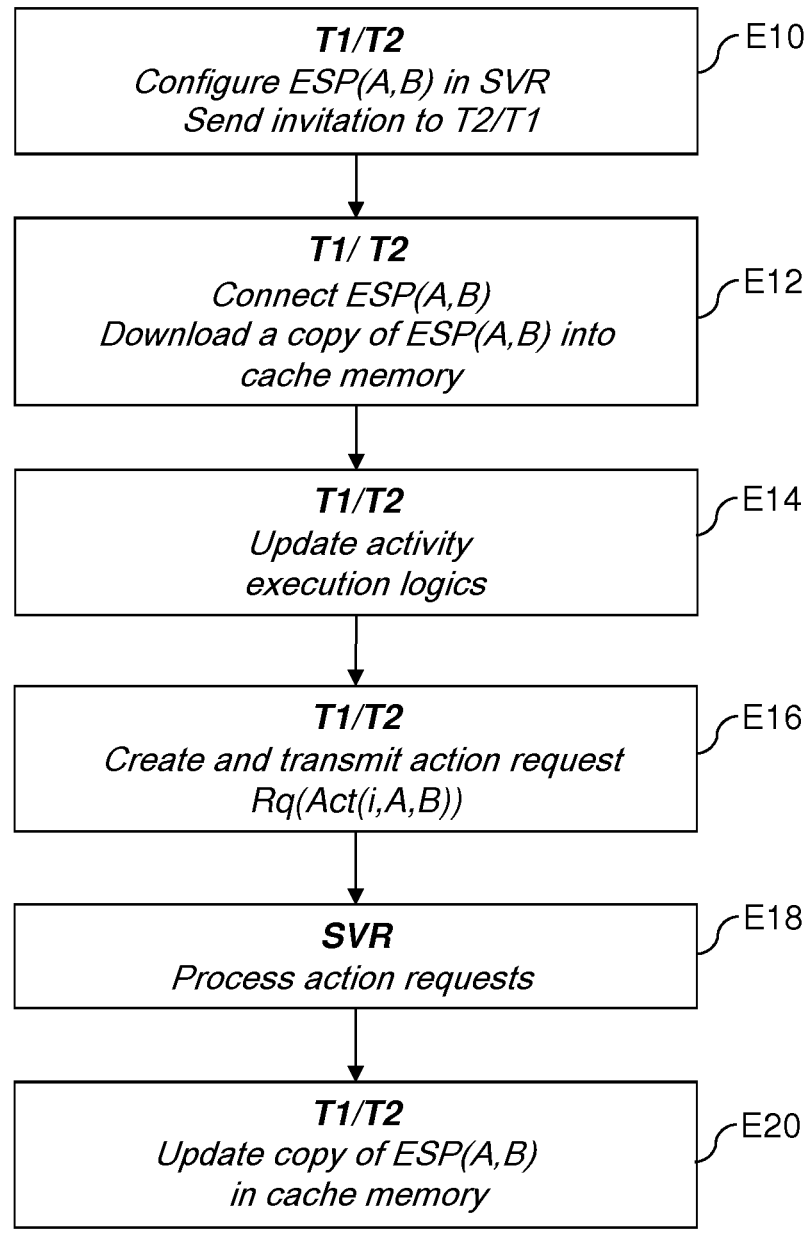
FIG. 2 is in the form of a flow chart showing the main steps of a method of the invention for communication between a plurality of users having communication terminals via a virtual communication space.

For simplification purposes, FIG. 2 shows the server SVR as being made up of entities (NO, SS, DB) that are located close to one another or that coincide within a single server. Nevertheless, it is equally possible to select an embodiment in which the server SVR is made up of entities that are remote from one another or that are distributed over the network. In particular, the multimedia content or data associated with the activities and shared within the virtual space may come from a server that is distinct and remote and that provides a multimedia content storage service (e.g. for photos).

In practice, the communication server is made up of elements having the hardware architecture of a computer 10. This architecture comprises in particular a processor (PRC) and memory components of the ROM and random access memory (RAM) type communicating via one or more data buses (Bs). From a functional point of view, the server SVR comprises the following modules:

a network communication interface module I/O-S for communicating with the network NW in particular for the purpose of receiving requests from user terminals T1, T2 associated with a virtual space stored in the database DB (e.g. creation and/or action requests), or to transmit notifications or updates about a given virtual space to the terminals (T1, T2) of users of the group associated with that space;

an operating system module OS-S managing interactions between the various modules and the processor PRC of the server; and a memory module M1-S storing instructions of the server application program AP-S of the invention, which, on being executed by the processor PRC, causes steps of the communication method of the invention to be performed, which steps are implemented in the server SVR, and in particular serve firstly to create a virtual communication space that is persistent for a group of users, which virtual space provides distinct modes of communication (referred to as "activities"); and serve secondly to process action requests relating to an activity under consideration and coming from the terminals of the users of the group, with the requests being processed sequentially in the order of their arrival.

The memory module M1-S serves in particular to store the software components giving access, via a web portal, to a space server entity SS and in particular to the application program interfaces (APIs) needed for remote interaction with the space server entity SS and the space database DB. The memory module M1-S also stores the software or algorithms for executing the communication modes (known as "activities") available in each virtual space that has been created. Finally, the memory module M1-S has a user authentication submodule that serves to verify the identity data of a user of a group of users during an attempt to connect with a virtual space.

Still with reference to FIG. 1, the internal structure of a user terminal of the invention is shown under reference number 20. The user terminals T1, T2 are constituted by elements arranged with the hardware architecture of a computer (20). This architecture comprises in particular a processor (PRC_T) and ROM and RAM type memory components communicating via one or more data buses (Bt).

From a functional point of view, the terminal T1, in this example a mobile terminal, includes in particular the functional modules described below:

a network communication interface module I/O for setting up communication sessions using a communication protocol such as a protocol of the hypertext transfer protocol (HTTP) type or of the hypertext transfer protocol secure (HTTPS) type, or indeed such as the session initiation protocol (SIP), over the network NW in order to communicate with the server SVR, and also to enable mobile telephony communication sessions to be set up with the other terminals of the group (the terminal T2 in this example);

an operating system module OS-T, e.g. the Android™ operating system from the supplier Google, for managing interaction between the various modules and the processor PRC-T of the terminal T1;

a display device SCR/KB associated with a (touch or mechanical) keyboard and a display screen coupled with a graphical user interface (GUI) module for presenting graphically to the user of the terminal data relating to a virtual space and to the associated multimedia contents;

a memory module M1-T storing program instructions of the client application AP-T of the invention, which, when executed by the processor PRC-T of the terminal, cause the steps of the communication method of the invention to be implemented, which steps are implemented in a user terminal T1 or T2. In particular, the memory module M1-T contains instructions that, on being executed, cause a connection to be made with the communication server SVR via the network NW in order to create a virtual communication space for a group of users, and cause requests to be generated for performing actions relating to an activity under consideration of a space that has already been created, which requests are then sent to the server. The memory M1-T also stores software components serving respectively to implement the algorithms (or "logics") for executing activities supplied by the virtual space hosted in the server, and for updating or downloading these algorithms from the server SVR, in particular when the application AP-T of the terminal does not have these algorithms initially or when new activities and the associated execution algorithms become available (changes in the service). The memory module M1-T also includes an orchestrator software module for managing the execution of activities in association with the graphic interface module GUI; and a second memory module M2-T of the cache memory type, i.e. a memory that acts temporarily to store copies of data coming from another data source in order to reduce access times (for reading and/or writing) of a processor to the data. In this example, the memory M2-T serves to store a copy replicating the current state of the virtual space under consideration (specifically associated with the group of users having the terminals T1 and T2), i.e. a copy replicating the multimedia contents associated with the activities supplied by the virtual space. This replicated copy is updated each time a terminal (T1, T2) connects to the server SVR. Access to the data stored in the memory M2-T or directly in the server SVR via a network connection is managed by a specific software module of the application AP-T.

FIG. 2 is in the form of a flow chart and it shows the main steps of the communication method of the invention.

A step E10 represents the operation of configuring a virtual space defined for a group of users comprising users referenced A and B, and having respective terminals T1 and T2. This configuration of the space ESP(A, B) in the server SVR may be performed at the initiative of the user A or of the user B after connection via a web browser of the terminal to the home page of the server SVR. During this configuration operation, the user creating the space, e.g. the user A, determines which users belong to the group, in this example the users A and B, and associates them with identifiers for connection to the space, which identifiers will serve subsequently as entry data for authenticating users for accessing the space. While the space is being configured, various communication modes referred to as "activities" Act(i, A, B) (for i in the range 1 to N) are selected by the user A, e.g. the following activities: sharing/consulting photos, sharing/consulting videos, sharing/consulting maps (road maps, itineraries, geographical maps, . . . ), communicating text (email, SMS and MMS messages, instant messaging), telephone communication, video phone communication.

The activities, which relate to one or more multimedia contents (activity content) shared by the users of the group, can thus be performed by specific actions such as creating, modifying, or deleting a given activity content. The activities relating to a multimedia content generate data that is to be stored after the activity has come to an end (e.g. modifying a drawing), whereas "real time" communication activities, such as telephone type voice communication, generate voice data that is of a transient nature (it persists for the time required to be transmitted from one speaker to the other). Nevertheless, in a possible implementation, on configuring the virtual space, the user may select an archiving or history-creation option that relates to exchanges between users (i.e. voice, videophone, or message exchanges), and also relating to contents or documents that are deleted by a user. Under such circumstances, archiving makes it possible in particular to restore contents that have been deleted unexpectedly or inadvertently.

Still in step E10, after the virtual space ESP(A, B) has been created, the members of the group are informed that the space has been created by the server automatically sending invitations to join the virtual space to the members of the group other than the user who created the space.

In a step E12, a user of the group (A, B) connects via a terminal (T1, T2) to the space ESP(A, B) after the server has validated that user's connection identifiers (e.g. an email address and a password). After the user's terminal has connected to the server SVR, the client application of the terminal triggers downloading into the cache memory M2-T of the terminal a copy replicating the multimedia contents associated with the activities provided by the virtual space ESP(A, B).

In a step E14, while the terminal in question (T1, T2) is connected to the server, or subsequently, the algorithms or execution logics of activities of the space ESP(A, B) are updated in the terminal.

In a step E16, one or more users of the group (A, B) select an action in the context of an activity by using the graphics interface of the client application launched in the terminal, e.g. making a modification to a drawing (drawing activity). This modification leads to the client application of the terminal creating an action request Rq(Act(i, A, B)). If the terminal is in connected-to-server mode, the action request is transmitted immediately to the server, otherwise the request is transmitted as soon as the terminal is connected to the server.

In the context of real time communication type activities (voice, videophone, . . . , communications) or of messaging type activities (SMS, instant messaging, . . . ), or indeed in the context of real time activities relating to a multimedia content, e.g. a synchronous drawing activity or synchronizing a route map, it is possible to make provision for the terminals of the users involved to communicate directly with one another without passing via the communication server in order to update their respective copies replicating the shared space. This serves to increase performance in terms of the speed of exchanges between terminals. A direct connection between terminals can then be implemented by a peer-to-peer (P2P) type connection using a communication protocol of the HTTP or SIP type, for example.

It should be observed that an activity that is being executed in asynchronous manner by a single user (e.g. creating a drawing) becomes synchronous in its execution as soon as some other user connects to the server and joins the activity.

In a step E18, the server SVR processes action requests coming from the terminals of users (A, B) as soon as they are received. Depending on the selected embodiment, action requests (for creating, modifying or deleting an activity content) are processed by the server serially in their arrival order, e.g. by storing the request temporarily in a first-in first-out (FIFO) type queue. This processing is associated with checking the consistency of the actions and the processing to be performed so as to avoid executing actions that would have the effect of contradicting a previously performed action. For example, an action for modifying a content is not executed if the content has already been deleted as a result of the server processing an earlier action.

After one or more actions have been processed by the server, in a step E20, the server transmits to each of the terminals of the users of the group an update of the copy replicating the multimedia contents of the virtual space, which copy is stored in the cache memory of each of the user terminals.

Although the present disclosure has been described with reference to one or more examples, workers skilled in the art will recognize that changes may be made in form and detail without departing from the scope of the disclosure and/or the appended claims.

The invention claimed is:

1. A communication method enabling a group of users having communication terminals to communicate via a virtual communication space provided by a communication server on a communication network, the communication method comprising operations including:
   configuring a server application on the communication server to create the virtual communication space for the group of users, wherein configuring comprises the following acts, which are performed via an access web page of said communication server that is displayed in a web browser of a communication terminal of a first user of the group of users:
      designating, by the first user, users to be included in the group of users, each user of the group of users associated with a user identifier determined by the first user, wherein said user identifier for each user of the group of users is used by the server application as entry data for authenticating access to the virtual communication space;
      selecting, by the first user, at least one communication activity from a plurality of distinct communication activities provided by the virtual communication space, wherein each of the selected at least one communication activity is associated with execution algorithms for performing actions related to at least one multimedia content that is shared by all users of the group of users, and wherein all users of the group of users have the same access rights to modify the at least one multimedia content using the execution algorithms; and
      creating the virtual communication space by the server application based on the designating and the selecting, and automatically transmitting notifications to each user of the group of users inviting said users to connect to the virtual communication space, wherein each of the notifications comprises the user identifier associated with one user of the group of users;
   receiving, by the communication server in response to the notifications, requests for connection to the virtual communication space from client applications on the communication terminals of the group of users, said requests each including one of the user identifiers to be used as the entry data for authenticating access;
   for each of said requests, the server application validating the user identifier and establishing a connection between the virtual communication space and the communication terminal associated with the validated user identifier;
   transmitting, by the server application to client applications on communication terminals with which the connection has been established, a copy replicating the at least one multimedia content and the execution algorithms for performing the actions to be downloaded into a cache memory of the communication terminals;
   receiving, by the server application from the client application connected to the virtual communication space, at least two action requests using the execution algorithms including at least a first request and a second request, the at least two action requests relating to at least one of the at least one selected communication activity and including at least actions of creating, modifying, or deleting the at least one multimedia content, wherein the at least two action requests are temporarily stored in a first-in first-out queue at the communication server in an order they are received;
   processing the first request, wherein said first request is received before said second request;
   checking consistency of actions of the second request with actions of the processed first request, and processing the second request only if the actions of the second request do not contradict with the actions of the processed first request;
   updating the at least one multimedia content according to the at least two requests that have been processed; and
   transmitting, by the server application, the updated at least one multimedia content to each of the client application connected to the virtual communication space, wherein each of the client applications stores the updated at least one multimedia content in the cache memory of the communication terminals.

2. The communication method according to claim 1, wherein each of the communication terminals of the group of users is provided with the client application for access to the virtual communication space, said client application being configured for triggering connection of the communication terminal to said communication server, said connection causing the copy replicating the at least one multimedia content associated with the selected at least one communication activity provided by the virtual communication space to be downloaded into the cache memory of the communication terminal.

3. The communication method according to claim 2, wherein the client application on the communication terminal of a user of the group of users connected to said communication server performs an initial operation of updating algorithms on the communication terminal connected to said communication server for executing the selected at least one communication activity made available by the virtual communication space hosted on the communication server.

4. The communication method according to claim 2, wherein, when processing in the communication server of a received request for an action relating to a communication activity causes the action of the received request to be executed, the at least one multimedia content associated with the communication activity related to the received request for the action is updated in the copies replicating the at least one multimedia content as stored in the cache memory of each of the communication terminals.

5. A communication server configured to implement a communication method on a communication network enabling a group of users having communication terminals to communicate via a virtual communication space provided by said communication server, the communication server comprising:
 a processor; and
 a non-transitory computer-readable medium comprising instructions stored thereon, which when executed by the processor configure the communication server to perform acts comprising:
 configuring a server application on the communication server to create the virtual communication space for the group of users, wherein configuring comprises the following acts, which are performed via an access web page of said communication server that is displayed in a web browser of a communication terminal of a first user of the group of users:
  designating, by the first user, users to be included in the group of users, each user of the group of users associated with a user identifier determined by the first user, wherein said user identifier for each user of the group of users is used by the server application as entry data for authenticating access to the virtual communication space;
  selecting, by the first user, at least one communication activity from a plurality of distinct communication activities provided by the virtual communication space, wherein each of the selected at least one communication activity is associated with execution algorithms for performing action related to at least one multimedia content that is shared by all users of the group of users, and wherein all users of the group of users have the same access rights to modify the at least one multimedia content using the execution algorithms; and
  creating the virtual communication space by the server application based on the designating and the selected, and automatically transmitting notifications to each user of the group of users inviting said users to connect to the virtual communication space, wherein each of the notifications comprises the user identifier associated with one user of the group of users;
  receiving, by the communication server in response to the notifications, requests for connection to the virtual communication space from client applications on the communication terminals of the group of users, said requests each including one of the user identifiers to be used as the entry data for authenticating access;
  for each of said requests, the server application validating the user identifier and establishing a connection between the virtual communication space and the communication terminal associated with the validated user identifier;
  transmitting, by the server application to client applications on communication terminals with which the connection has been established, a copy replicating the at least one multimedia content and the execution algorithms for performing the actions to be downloaded into a cache memory of the communication terminals;
  receiving, by the server application from the client application connected to the virtual communication space, at least two action requests using the execution algorithms including at least a first request and a second request, the at least two action requests relating to at least one of the at least one selected communication activity and including at least actions of creating, modifying, or deleting the at least one multimedia content, wherein the at least two action requests are temporarily stored in a first-in first-out queue at the communication server in an order they are received;
  processing the first request, wherein said first request is received before said second request;
  checking consistency of actions of the second request with the actions of the processed first request, and processing the second request only if the actions of the second request do not contradict with the actions of the processed first request;
  updating the at least one multimedia content according to the at least two requests that have been processed; and
 transmitting, by the server application, the updated at least one multimedia content to each of the client applications connected to the virtual communication space, wherein each of the client applications stores the updated at least one multimedia content in the cache memory of the communication terminals.

6. A non-transitory computer-readable storage medium comprising a computer program stored thereon and including program instructions that, when executed by a processor, serve to implement a communication method enabling a group of users having communication terminals to communicate via a virtual communication space provided by a communication server on a communication network, the instructions including:
 instructions that configure a server application on the communication server so as to create the virtual communication space for the group of users, wherein configuring the server application comprises the following acts, which are performed via an access web page of said communication server that is displayed in a web browser of a communication terminal of a first user of the group of users:
  designating, by the first user, users to be included in the group of users, each user of the group of users associated with a user identifier determined by the first user, wherein said user identifier for each user of the group of users is used by the server application as entry data for authenticating access to the virtual communication space;
  selecting, by the first user, at least one communication activity from a plurality of distinct communication activities provided by the virtual communication space, wherein each of the selected at least one communication activity is associated with execution algorithms for performing actions related to at least one multimedia content that is shared by all users of the group of users, and wherein all users of the group of users have the same access rights to modify the at least one multimedia content using the execution algorithms; and creating the virtual communication space by the server application based on the designating and the selecting, and automatically transmitting notifications to each user of the group of users inviting said users to connect to the virtual communication space, wherein each of the notifications comprises the user identifier associated with one user of the group of users;

instructions that configure the communication server to receive, in response to the notifications, requests for connection to the virtual communication space from client applications on the communication terminals of the group of users, said requests each including one of the user identifiers to be used as the entry data for authenticating access;

instructions that configure the server application to, for each of said requests, validate the user identifier and establish a connection between the virtual communication space and the communication terminal associated with the validated user identifier;

instructions that configure the server application to transmit to client application on communication terminals with which the connection has been established, a copy replicating the at least one multimedia content and the execution algorithms for performing the actions to be downloaded into a cache memory of the communication terminals;

instructions that configure the server application to receive from the client applications connected to the virtual communication space at least two action requests using the execution algorithms including at least a first request and a second request, the at least two action requests relating to at least one of the at least one selected communication activity and including at least actions of creating, modifying, or deleting the at least one multimedia content, wherein the at least two action requests are temporarily stored in a first-in first-out queue at the communication server in an order they are received;

instructions that configure the communication server to process the first request, wherein said first request as received before said second request;

instructions that configure the server application to check consistency of actions of the second request with actions of the processed first request, and process the second request only if the actions of the second request do not contradict with the actions of the processed first request;

instructions that configure the server application to update the at least one multimedia content according to the at least two requests that have been processed; and instructions that configure the server application to transmit the updated at least one multimedia content to each of the client applications connected to the virtual communication space, wherein each of the client applications stores the updated at least one multimedia content in the cache memory of the communication terminals.

\* \* \* \* \*